United States Patent [19]

Brockwell et al.

[11] Patent Number: 5,175,014
[45] Date of Patent: Dec. 29, 1992

[54] METHOD AND APPARATUS FOR COLLATING AND CONSOLIDATING NATURAL CHEESE BLOCKS

[75] Inventors: Ian P. Brockwell, Edina; Herbert W. Hancock, deceased, late of Somerset, Great Britain, by Joan Mary Hancock, administratix

[73] Assignee: Alfa-Laval Cheese Systems Limited, Somerset, England

[21] Appl. No.: 80,462

[22] PCT Filed: Sep. 25, 1986

[86] PCT No.: PCT/GB86/00575
§ 371 Date: Jun. 5, 1990
§ 102(e) Date: Jun. 5, 1990

[87] PCT Pub. No.: WO87/01906
PCT Pub. Date: Apr. 9, 1987

[30] Foreign Application Priority Data

Sep. 25, 1985 [GB] United Kingdom ............ 8523904

[51] Int. Cl.⁵ .................... A23C 19/00; B65B 31/00
[52] U.S. Cl. ........................... 426/582; 53/86; 53/512; 99/454; 99/460; 426/512

[58] Field of Search ............ 426/582, 512, 491; 99/454, 460, 472; 53/86, 512; 100/116, 127; 425/85, 147

[56] References Cited

U.S. PATENT DOCUMENTS

4,049,838 9/1977 Krueger et al. ............... 426/582
4,744,203 5/1988 Brockwell et al. ............ 53/86

*Primary Examiner*—George Yeung
*Attorney, Agent, or Firm*—Davis Hoxie Faithfull & Hapgood

[57] ABSTRACT

Blocks of natural cheese (11) are packed in layers in an open-ended upright container (17), for maturing by depositing each layer of cheese blocks (11) on an elevator (18) within the container (17) and lowering the elevator (18) as successive layers of cheese blocks (11) are fed into the top of container (17). The cheese blocks (11) for each layer are assembled on a platform (52) which is moved into a position above the container (17) and the cheese blocks (11) slid off the platform (52) to drop into the container (17). The cheese blocks (11) are freshly made and at a temperature between 24° 32° C. so that the cheese blocks (11) fuse together in the container (17) to form a homogeneous mass of cheese in the container (17).

20 Claims, 7 Drawing Sheets

METHOD AND APPARATUS FOR COLLATING AND CONSOLIDATING NATURAL CHEESE BLOCKS

This invention relates to the packaging of natural cheese produced by compressing cheese curd to consolidate the particles of curd into blocks of natural cheese, and is concerned more particularly with a method and apparatus for collating and consolidating blocks of natural cheese into a homogeneous mass of cheese in a container, preparatory to maturing of the cheese.

In the commercial manufacture of hard cheese, the cheese curd is compressed into rectangular blocks of approximately the same size, each block weighing about 40 lb. Each block is enclosed in a separate sealed container and the cheese containers stacked at a maturing station for the appropriate time under the required maturing conditions. The handling of large numbers of cheese containers is however costly in labour and storage facilities.

According to the present invention there is provided a method of collating and consolidating blocks of natural cheese into a homogeneous mass of cheese, comprising filling a container with naked i.e. unwrapped blocks of cheese while the blocks are freshly made and at a temperature within the range 24°-32° Celsius due to the heat applied in processing the milk and curd used to make the cheese, whereby the cheese blocks spread into contact with each other under the overlying weight of the cheese and the cheese blocks fuse together to form a homogeneous mass of cheese in the container. The container is preferably filled with the cheese blocks while they are at a temperature of approximately 30° Celsius.

The present invention has the advantage that the cheese can be matured in large containers each holding for example 640 lbs of cheese formed from sixteen separate 40 lb cheese blocks fused together in accordance with the invention. The use of such large containers can provide economies in the costs for handling and storage, compared to the costs for the same weight of cheese in 40 lb containers.

In the method of the invention, it is essential that the temperature of the cheese blocks does not drop below 24° Celsius during the filling of the container, since below this temperature a skin forms on the exterior of the cheese block and any such skin would prevent homogeneous fusion of adjacent cheese blocks.

In the method of the invention, it is also essential that the container be filled with cheese blocks which are freshly made, that is the cheese blocks must be fed direct from the cheese press to the container without delay. In a method according to the invention for collating and consolidating blocks of cheese formed by a process in which the curd passes through equipment which salts and mellows the curd prior to pressing of the curd into cheese blocks, each cheese block is preferably fed into the container within 60 minutes from the time when the curd used to make the cheese block was discharged from the salting/mellowing equipment, but optimum results are obtained when each cheese block is fed into the container within 30-40 minutes of discharge from the salting/mellowing equipment.

Cheese blocks at a temperature within the range 24°-32° Celsius and solid enough to enable the naked blocks to be handled mechanically can be produced within 30-40 minutes of the curd leaving the salting/mellowing equipment by machines of the kind described and illustrated in British Patent Specification No. 1,542,844 which forms cheese blocks by consolidating curd particles under vacuum and then compressing the consolidated curd. Sufficient machines should be provided to produce cheese blocks at a rate sufficient to fill a container before the temperature of the blocks in the container drops below 24° C.

Two collators of different construction for collating blocks of cheese in layers in an open-ended rectangular container in accordance with the method of the invention will now be described, by way of example, with reference to the accompanying drawings, in which.

The collator of FIG. 1 comprises an endless belt conveyor 10 for transporting blocks of cheese 11 to a loading station 12, a frame 13 providing a pair of rails 14 extending parallel to the belt 15 of the conveyor 10 but at a lower level, a trolley 16 mounted on the rails 14, the trolley 16 supporting an open-ended rectangular container 17 in an upright position, a scissors-type elevator 18 mounted on a base 19 below the rails 14, a frame 20 straddling the frame 13 and providing a pair of rails 21 extending across the rails 14 at a higher level and above the elevator 18, and a carriage 22 mounted on the rails 21 for transporting cheese blocks 11 from the conveyor 10 to the container 17.

The belt conveyor 10 has a frame comprising two side plates 25,26 arranged on opposite sides of the belt 15 with the upper edges of the side plates substantially flush with the upper run of the belt 15. The side plate 26 remote from the frames 13,20 is fitted at the loading station 12 with a piston and cylinder unit 27 operable to move a pusher plate 28 across the belt 15.

The trolley 16 comprises an open rectangular frame consisting of four side members 30 fitted with wheels which run on the rails 14 and four corner pieces 32. The container is supported on the side members 30 and is located thereon by the corner pieces 32 which engage around the bottom corners of the container. The width of the frame members 30 is such that they project a small distance inwards beyond the inside surface of the container to provide support for an end panel 33 (shown only in FIGS. 3a-3f).

The container 17 may be made of any suitable material, such as wood, plastics, cardboard or stainless steel. The container is lined internally with a tube 35 of heat-sealable plastics sheet material which is impervious to air and moisture, the upper end of the tube being turned down over the top of the walls of the container and the lower end of the tube being turned up under the bottom of the walls of the container. The ends of the tube are held in position by detachable straps 36. The end panel 33 is of a size such that is can be raised and lowered inside the lined container, but is adapted to rest on the side members 30 of the trolley 16 when the end panel is at the bottom of the container.

Figure 3A:
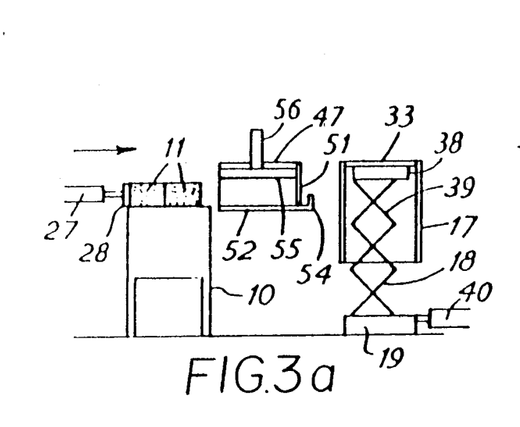
FIGS. 3a-3f are diagrammatic views of components of the collator of FIG. 1 illustrating their relative movements during a cycle of operation of the collator.

The scissors-type elevator 18 is of conventional construction and, as shown in FIG. 3a, comprises a platform 38, scissors linkage 39 pivotally connected to the base 19 and supporting the platform, and a piston and cylinder unit 40 mounted on the base 19 and operable to expand and contract the linkage to raise and lower the platform 38. The platform and linkage are of a size to pass through the centre of the open rectangular frame of the trolley and through the interior of the container.

The carriage 22 comprises a trolley 45 fitted with wheels which run on the rails 21 and cage 47 suspended from the trolley 45 by two piston and cylinder units 48 operable to raise and lower the cage. The cage comprises a box-shaped structure which is open at the front end adjacent the conveyor 10, and comprises a top plate 49, two side plates 50 secured to opposite sides respectively of the top plate 49, a rear plate 51 (FIG. 3) secured to the plates 49, 50 at the ends thereof remote from the conveyor 10, and a floor plate 52 which is slidably mounted on guide rails (not shown) on the side plates 50. The floor plate 52 is at a level below that of the rear plate 51 and is movable rearwardly along its guide rails by piston and cylinder units 53 (FIG. 1) secured on the side plates 50 and connected to a flange 54 on the rear end of the floor plate. The floor plate is movable rearwardly by the cylinder units 53 into a fully retracted position in which it is positioned wholly behind the rear plate 51. A follower plate 55 is mounted in the cage below the top plate 49, the follower plate being suspended from the piston rod of a piston and cylinder unit 56 mounted on the top of the plate 49 and operable to lower and raise the follower plate 55.

The carriage 22 is movable along the rails 21 between a forward position and a rear position by a piston and cylinder unit 58 mounted on the frame 20. In its forward position, the carriage 22 is adjacent the belt conveyor 10 and the cage 47 can be lowered by the cylinder units 48 to a position in which the floor plate 52 is alongside and level with the top run of the belt 15 of the conveyor. In the rear position the carriage 22 is directly above the elevator 18.

Figures 1, 2:
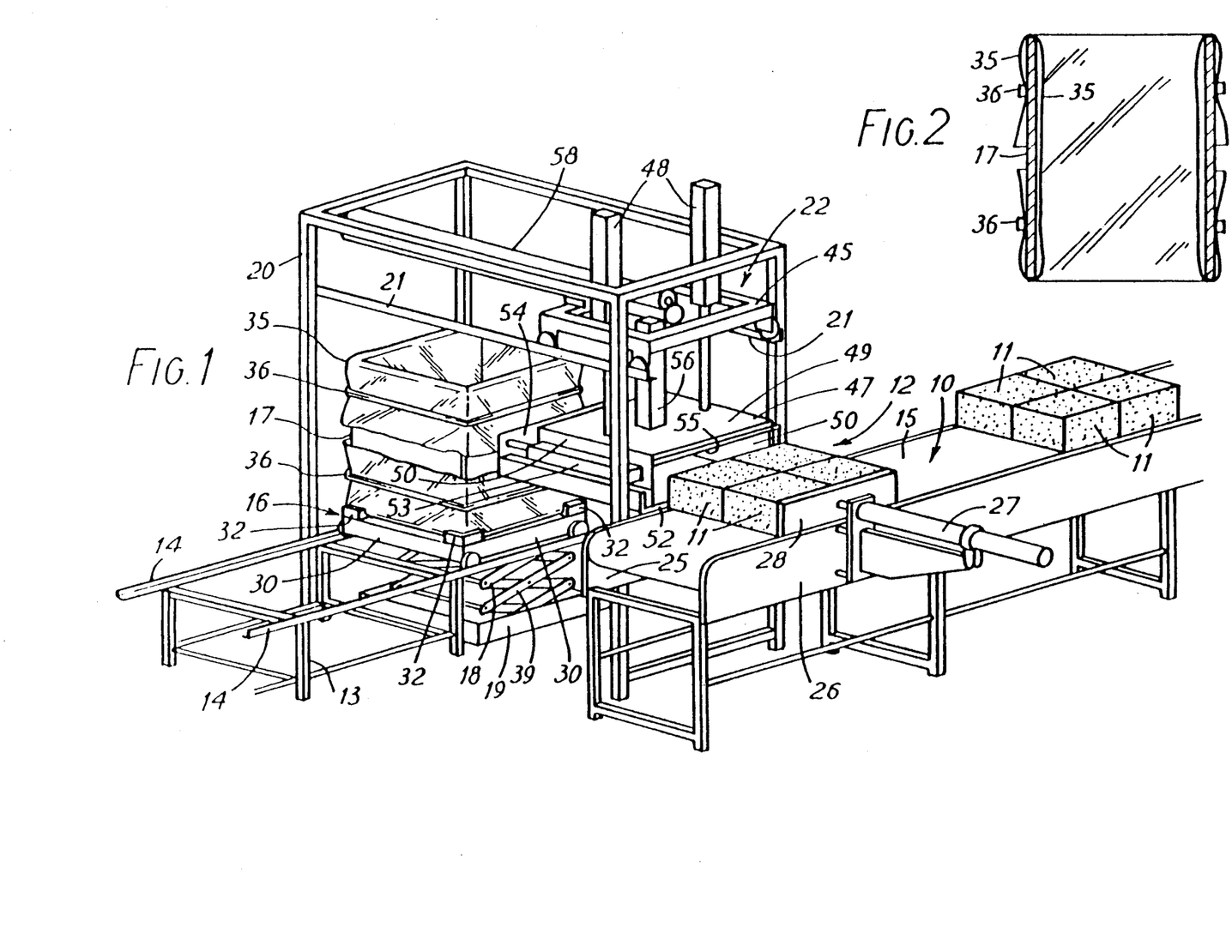
FIG. 1 is an isometric projection view of a collator having one container-filling station.
FIG. 2 is a sectional elevation view of the container fitted with an internal lining.

The collator shown in the FIG. 1 is designed to fill the lined container 17 with sixteen naked blocks of natural cheese, each of 40 lb weight, the blocks having substantially the same dimensions and arranged in four layers each of four blocks, and the container being of a size such that the cheese blocks fill the container. The cage 47 is of a size to accommodate four cheese blocks as a close fit.

In a cycle of operation of the collator, the components are first positioned as shown in FIG. 1 with a lined container 17 mounted on the trolley 16 directly above the elevator 18, and the carriage 22 in its forward position with the cage 47 lowered to a position in which the floor plate 52 is flush with the top run of the endless belt 15. The follower plate 55 in the cage is in its fully raised position. Four cheese blocks 11 are arranged in a group on the endless belt 15 as shown in FIG. 1, and the cheese blocks transported to the loading station 12 in which the cheese blocks are aligned with the open front end of the cage. The cheese blocks 11 are all freshly made by several cheese making machines of the kind described and illustrated in British Patent Specification 1,542,844 so that the blocks are at a temperatures within the ranges 24°-32° C.

Figure 3B:
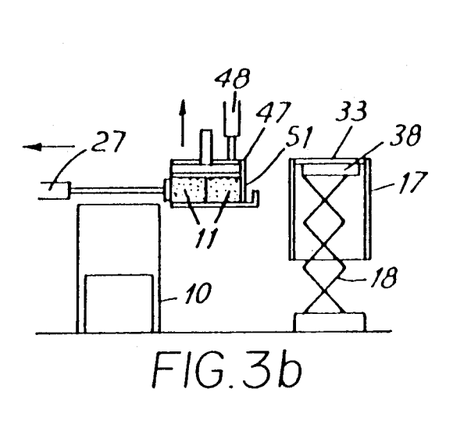
Figure 3C:
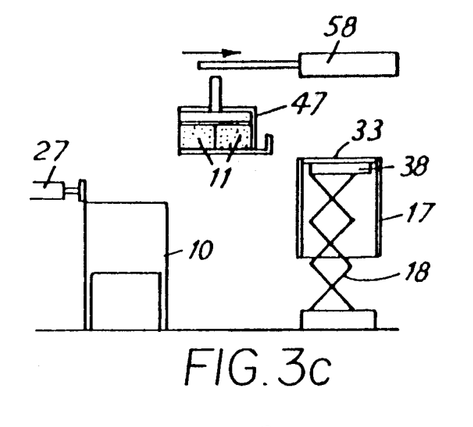
Figure 3D:
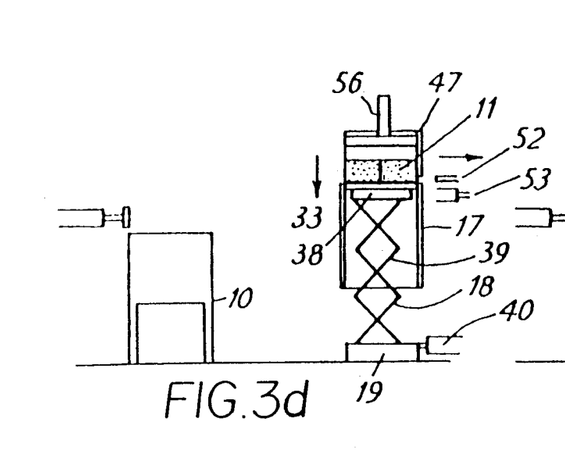
Figure 3E:
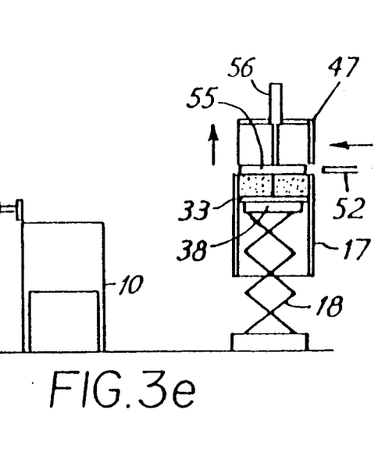

The sequence of movements of the components of the collator are illustrated in FIGS. 3a-3f. As shown in FIG. 3a, the scissors-type elevator 18 is extended to a position in which it projects into the interior of the open-ended container with its platform 38 approximately level with the upper end of the container, an end panel 33 is mounted on the platform 38 of the elevator with the end panel centred within the container, and as shown in FIG. 3b the four cheese blocks 11 at the loading station 12 are pushed off the belt of the conveyor and into the cage 47 by the cylinder unit 27. The cylinder unit 27 is then retracted while the cage 47 is raised by the cylinder units 48 up to a level above the top of the container 17 as shown in FIG. 3c. The carriage 22 together with the cage 47 containing the cheese blocks is then moved along the rails 21 by the piston and cylinder unit 58 to its rear position in which the cage is directly over the container, as shown in FIG. 3d. The floor plate 52 is then fully retracted by its cylinder units 53, so that the cheese blocks 11 drop down onto the end panel 33, as shown in FIG. 3d. The platform 18 of the elevator is then lowered by a distance equal to the depth of the cheese blocks, and the follower plate 55 in the cage moved downwards by the cylinder unit 56 simultaneously with the lowering of the elevator so as to ensure that the end panel 33 and the cheese blocks pass into the top of the container as shown in FIG. 3e. The cage is held in position directly over the container with the follower plate 55 held downwards against the cheese blocks during the period in which the next four cheese blocks are being arranged in a group on the endless belt conveyor and transported to the loading station 12. During this period, the follower plate 55 seals off the cheese blocks in the container from the atmosphere and thereby prevents heat loss which would occur by evaporation of whey if the cheese blocks were open to atmosphere.

Figure 3F:
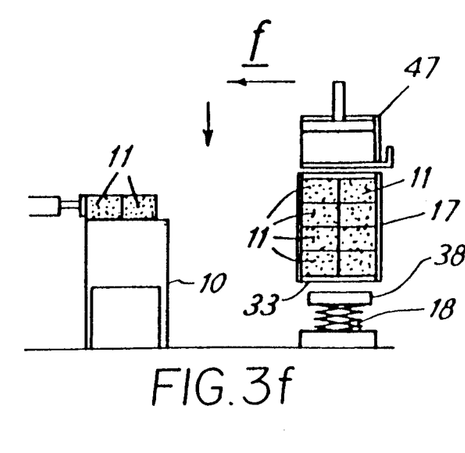

When the next group of four cheese blocks is at the loading station 12, the follower plate 55 is returned to its fully raised position, the floor plate 52 returned into the cage, the carriage 22 returned to its forward position, and the cage lowered to its original position alongside the belt of the conveyor for reception of the next group of four cheese blocks. The cycle of operations is repeated until the container is filled with cheese blocks, as shown in FIG. 3f.

The cheese blocks packed into the container do not maintain their dimensional stability, but collapse due to plastic flow of the hot freshly made cheese. The cheese blocks are then in close contact with one another, and at the temperature within the range 24°-32° C. the cheese at the adjacent surfaces of the blocks fuses together chemically, so that the blocks form a homogeneous mass of cheese.

When the container is filled with the cheese blocks, the elevator 18 is collapsed to its lowest position, so that the end panel 33 engages against the side member 30 of the trolley and supports the cheese mass within the container. The trolley carrying the filled container is then moved along the rails 14 to a packing station.

At the packing station, the strap 36 holding the upper end of the liner tube 35 is released and sealing means such as heat-sealing jaws employed to seal the end of the liner. Subsequently, a lid is fixed on the container and the container then inverted by apparatus supplied for this purpose adjacent to the rails 14. At this position, the strap 36 holding the originally lower (now upper) end of the liner is released, and the liner evacuated by a deep vacuum pump system so that the liner provides a compressive force against the cheese mass. The liner is then sealed to retain this vacuum compressed condition, and the container closed by a further lid.

Figure 4:
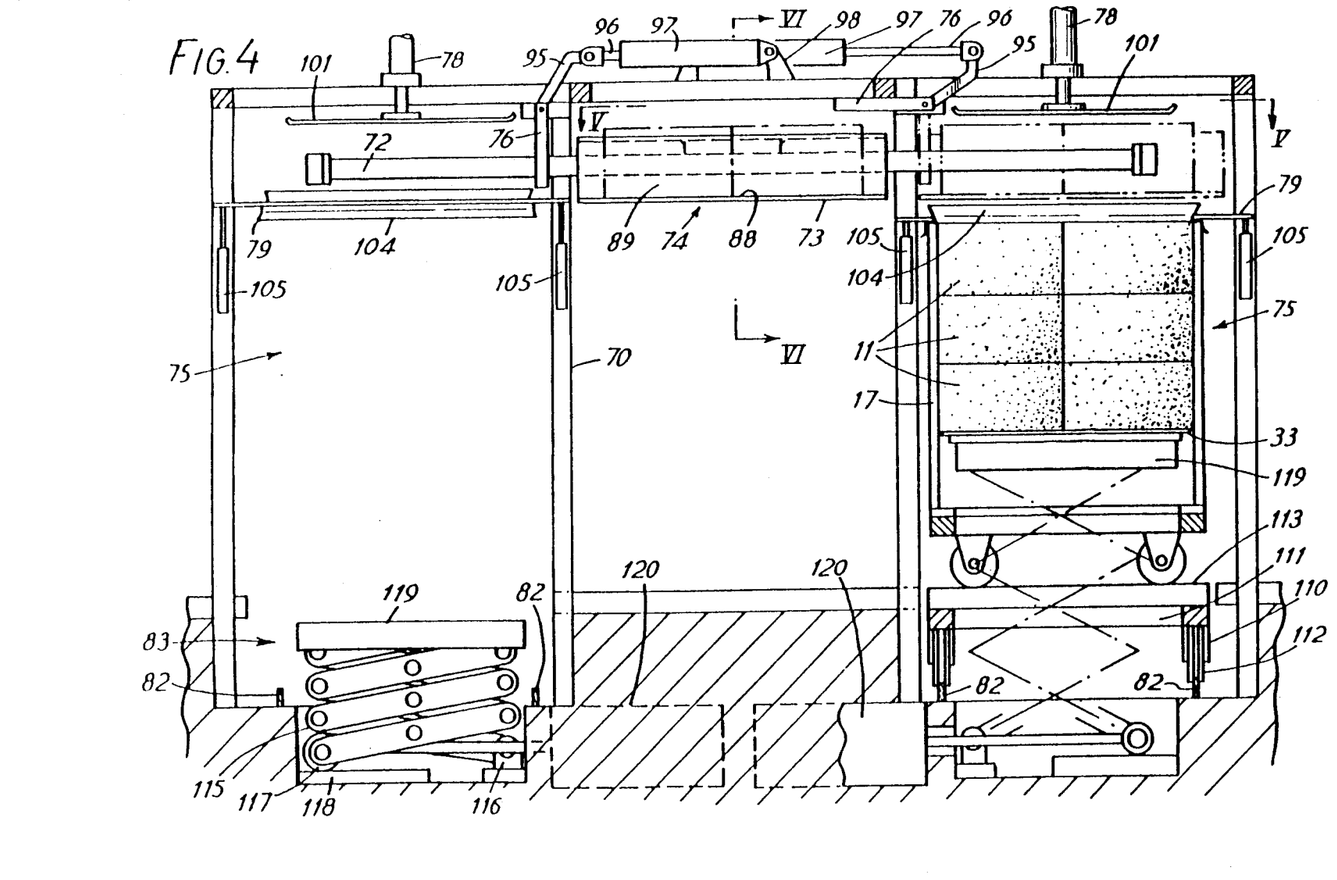
FIG. 4 is a front elevation view of another form of collator having two container filling stations, a partially filled container being shown at one of the stations.
Figure 5:
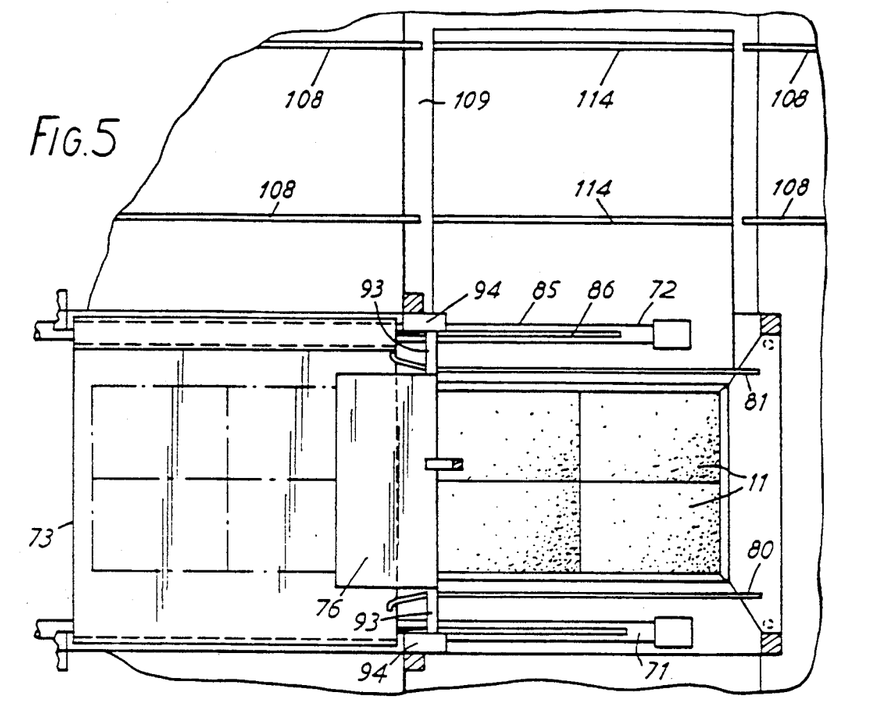
FIG. 5 is a plan view of part of the collator and container of FIG. 4 taken along the line V—V in FIG. 4.
Figure 6:
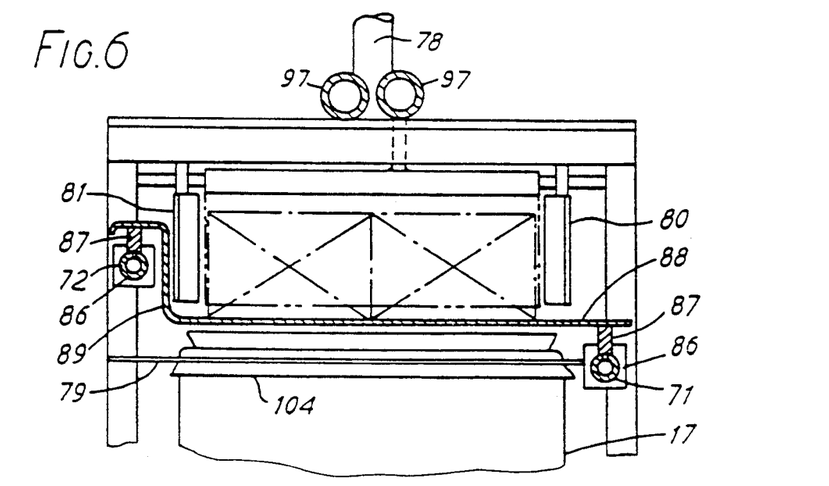
FIG. 6 is an end elevation view of part of the collator and container of FIG. 4 taken along the line VI—VI in FIG. 4.

The collator shown in FIGS. 4–6 comprises an open rectangular frame 70 fitted at the upper portion thereof with front and rear pneumatic cylinder motors 71,72 (FIG. 6) extending along the length of the frame and supporting a carriage 73 for movement between a central loading station 74 (FIG. 4) and two container filling stations 75 positioned one at each side of the loading station 74. Two hydraulically operated gates 76, are pivotally mounted on the frame one on each side of the loading station 74, two hydraulic rams 78 for pressing the cheese blocks downwards into the containers are mounted on the frame one at each filling station 75, and two container locating devices 79 are also mounted on the frame one at each filling station 75. The frame 70 is also fitted with front and rear guide plates 80, 81 respectively at each of the container filling stations 75, the guide plates being arranged to centre cheese blocks on the carriage 73 upon movement of the carriage into the associated container filling station. The frame 70 straddles two pairs of parallel rails 82 extending one pair through each of the container filling stations 75, and two scissors-type elevators 83 are mounted one between each pairs of rails at the filling stations 75.

The cylinder motors 71, 72 are of the known type comprising a cylinder barrel 85 provided with a slit 86 (FIG. 5) along its length, a piston (not shown) having a load carrying lug 87 (FIG. 6) projecting through the slit, and thin steel bands (not shown) extending through openings in the lug and sealing the slit along its length. As shown in FIG. 6, the front cylinder motor 71 is mounted at a lower level from that of the rear cylinder motor 72, and the carriage 73 comprises a plate having the rear end portion stepped upwardly to define a horizontal platform 88 and a wall 89 at the rear of the platform, the front edge of the carriage being mounted on the lug of the front cylinder motor 71 and the rear edge of the carriage being mounted on the lug of the cylinder motor 72.

Each of the gates 76 comprises a plate having one edge thereof welded to a horizontal bar 93 which extends in the fore and aft direction and is pivotally mounted at its ends in brackets 94 on the frame 70. The centre portion of the gate 76 adjacent the bar 93 is also welded to one end of a crank 95 the other end of which is pivotally connected to the piston rod 96 of a hydraulic cylinder 97 the head end of which is pivotally connected to a bracket 98 on the frame 70. The cylinder 97 is arranged so that, upon extension of the piston rod, the gate 76 is swung into a horizontal open position as shown on the right hand side of FIG. 4 and, upon retraction of the piston rod, the gate 76 is swung into a dependent closed position as shown on the left hand side of FIG. 4. When the gate 76 is in the open horizontal position, the carriage 73 together with a batch of cheese blocks 11 thereon are free to pass below the gate and move from the loading station to the associated filling station. When however the gate is in the closed dependent position, the carriage 73 is free to pass below the gate but any cheese blocks on the carriage abut against the gate.

Each hydraulic ram 78 comprises an inverted cylinder secured to a bracket on the frame 70 and a horizontal follower plate 101 secured to the lower end of the piston rod of the cylinder. The follower pate is of a size to be a free fit within the mouth of a container to be filled with the cheese blocks.

Each container locating device 79 comprises a rectangular collar 104 supported on four hydraulic actuators 105 (FIG. 4) mounted on the frame 70 and connected one to each corner of the collar. The lower portion of the collar is shaped to define a socket which is flared in the downwards direction and which is of a size to engage around the top of a container 17 as a close fit. The upper portion of the collar is of smaller dimensions and shaped to define a funnel for directing cheese blocks into a container fitted in the collar. The actuators 105 are operable to pull the collar downwards onto the top of a container in the filling station and thereby locate the container in a predetermined position relative to the frame 70.

The frame 70 of the collator is positioned to the front of a pair of rails 108 (FIG. 5) for wheeled trolleys 16 supporting open-ended rectangular containers 17 to be filled with cheese blocks. The trolleys 16 and containers 17 are the same as those used with the collator of FIG. 1 and like parts are denoted by like reference numbers in the Figures illustrating the two collators. The rails 108 are formed with a gap 109 at the rear of each of the two filling stations 75 in the collator, and the rails 82 at each filling station extend rearwards through the gap in the rails 108 but at a lower level. Each of the filling stations of the collator is provided with a shuttle dolly 110 fitted with wheels 112 which run on the rails 82 (only one dolly is shown in FIG. 4). Each shuttle dolly supports two pairs of rails 113, 114 (FIG. 8) which are arranged parallel to the rails 108, the rails 113 being on the front end portion of the dolly and adapted to bridge the gap in the rails 108 when the dolly is in a rear position, and the rails 114 being on the rear end portion of the dolly and adapted to bridge the gap in the rails 108 when the dolly is in a forward position. When the dolly is in the forward position, the rails 113 are in register with the associated filling station. The front end portion of each dolly has an opening 111 (FIGS. 4 and 8) between the pair of rails 113 for passage of the scissors-like elevator 83.

Figure 8:
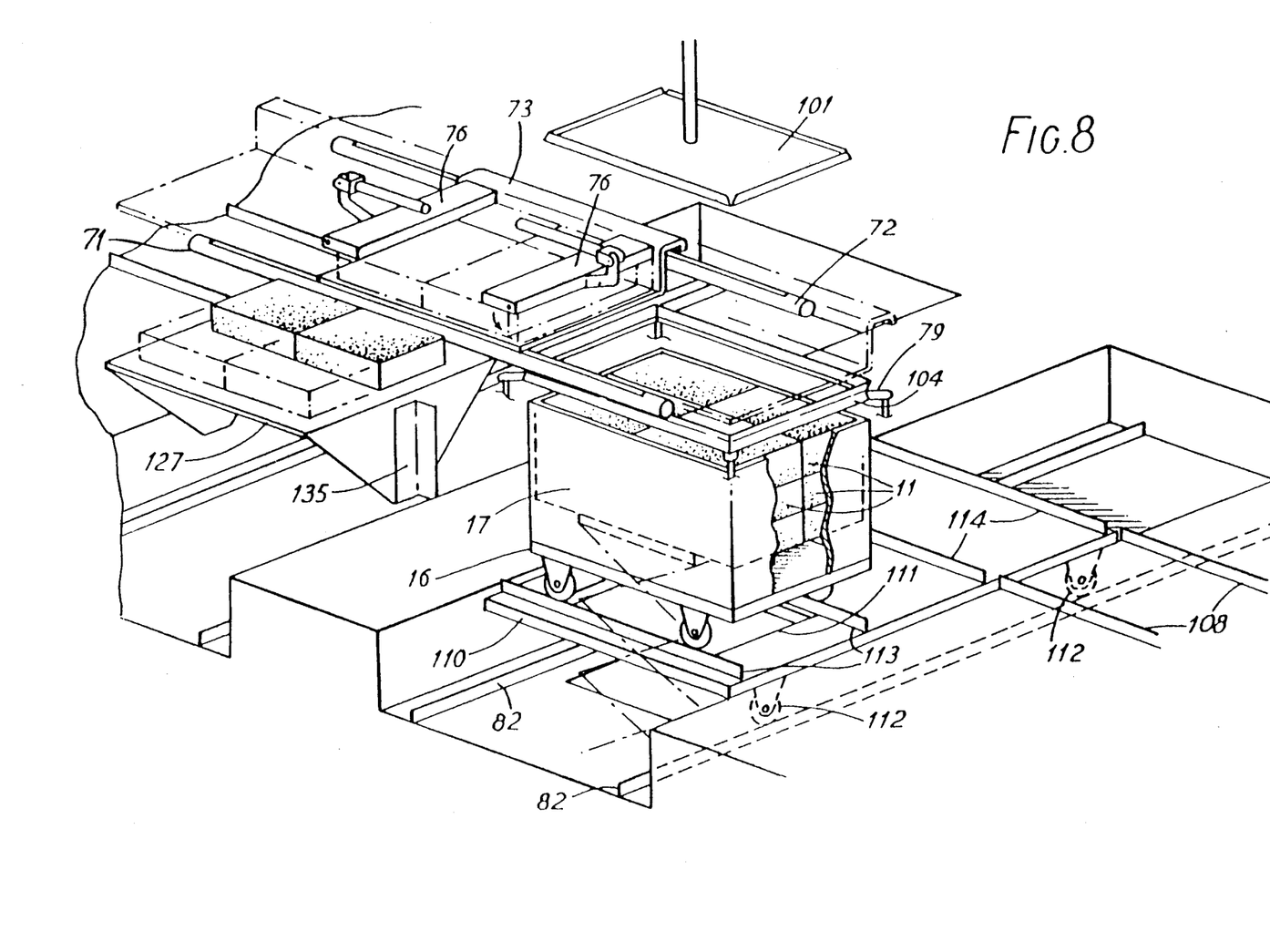
FIG. 8 is an isometric view of the collator and elevator table of FIGS. 4 and 7 showing only the movable components to illustrate the operation of the collator.

The elevator 83 comprises upright scissors linkage 115 having one of the bottom links pivotally connected to a fixed bracket 116 and the other bottom link fitted with a roller 117 in rolling engagement with a base plate 118, a platform 119 supported on the top of the linkage 115, and a piston and cylinder unit 120 operably to expand and contract the linkage to raise and lower the platform 119. The platform and linkage are of a size to pass through the opening 111 in the dolly, through the centre of the open rectangular frame of a trolley 16 when mounted on the rails 113 on the dolly, and through the interior of the container 17.

Figure 7:
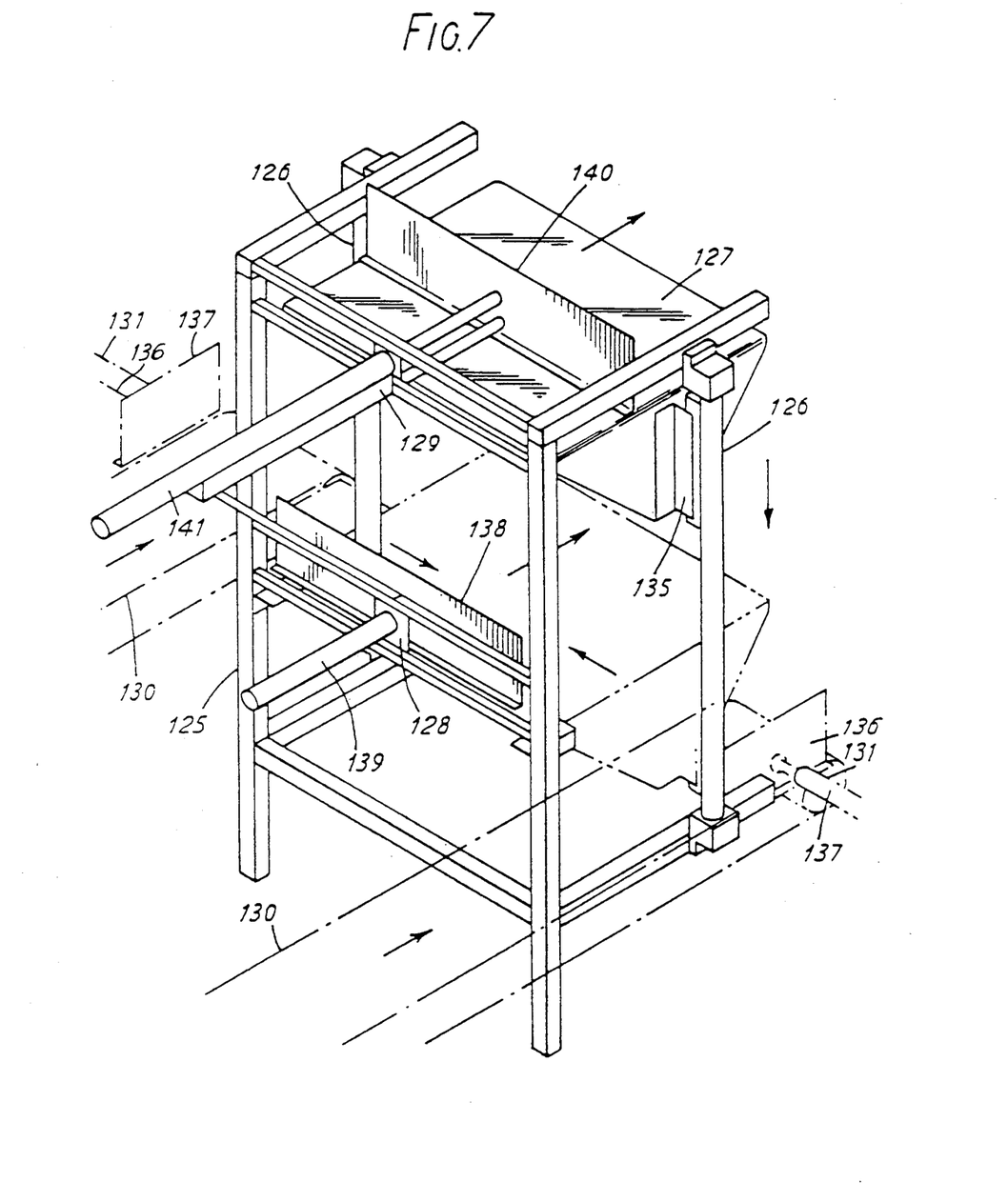
FIG. 7 is an isometric view of a table elevator for supplying a batch of cheese blocks to the collator of FIGS. 4-6.

The table elevator shown in FIG. 7 comprises a frame 125 supporting two upright cylinder motors 126 arranged one on each side of the frame, a table 127 supported by the cylinder motors 126, and lower and upper loaders 128, 129 mounted on the front of the frame 125. The table elevator is positioned in front of the centre portion of the collator and between two belt conveyors 130 each fitted with a loader 131, the conveyors 130 and loaders 131 being shown in broken lines in FIG. 7. The belts of the two conveyors are at the same level.

The cylinder motors 126 are similar in construction to the cylinder motors 71, 72 of the collator and the table 127 is fitted at the sides thereof with brackets 135 which are secured to the pistons of the cylinder motors. The cylinder motors 126 are operable to raise and lower the table 127 between a lower position shown in broken lines in FIG. 7 in which the top of the table is flush with the belts of the conveyors, and an upper position shown in full lines in FIG. 7 i which the top of the table is flush with the platform 88 on the carriage of the collator. Each of the loaders 131 on the conveyors 130 comprises a pusher plate 136 and a piston and cylinder unit 137 operable to move the pusher plate 136 across the conveyor belt and slide a cheese block on the belt onto the table 127 when the table is in its lower position. The lower loader 128 comprises a pusher plate 138 and a piston and cylinder unit 139 operable to move the pusher plate 138 rearwardly across the table when the table is in its lower position. The pusher plate 138 is retractable to a position to the front of the table to permit upward movement of the table. The upper loader 129 comprises a pusher plate 140 and a piston and cylinder unit 141 operable to move the pusher plate 140 rearwardly across the table when the table is in its upper position.

In a cycle of operation, the collator is arranged with its carriage 73 in the central loading position 74, the gates 76 in the open position, the follower plates 101 in the fully raised position, the container locating devices 79 in the raised position, and the scissors elevators 83 in the fully lowered position. A container 17 is lined as previously described and shown in FIG. 2, and the lined container is mounted on a trolley 16 on the rails 108. The shuttle dolly 110 for one container filling stations is moved along the rails 82 into its rear position with its rails 113 aligned with the rails 108, the trolley 16 supporting the lined container 17 is moved along the rails 108 and onto the rails 113, the dolly moved forwards into the filling station as shown in FIGS. 5 and 8, the associated container locating device 70 operated to engage the collar 104 around the top of the container, the scissors elevator 83 extended upwards through the dolly, the trolley and the container to a position in which its platform 119 is level with the top of the container, and an end panel 33 for the container mounted on the platform 119. The table elevator is arranged with the table 127 in its lower position and the loaders 128, 129 in the fully retracted position. Freshly made cheese blocks at a temperature between 24°-32° C. are then fed onto the belt conveyors 130.

The first cheese block on each conveyor, upon arrival at the table elevator, is slid off the conveyor and onto the table 127 by the loader 137. The two cheese blocks from the two conveyors are then slid rearwards by the loader 128. The loader 128 is then retracted and the next two cheese blocks loaded onto the table, so as to form a batch of four cheese blocks. The table is then raised to its upper position and the four cheese blocks slid rearwardly off the table and onto the carriage 73 of the collator as shown in FIG. 8.

Figure 9A:
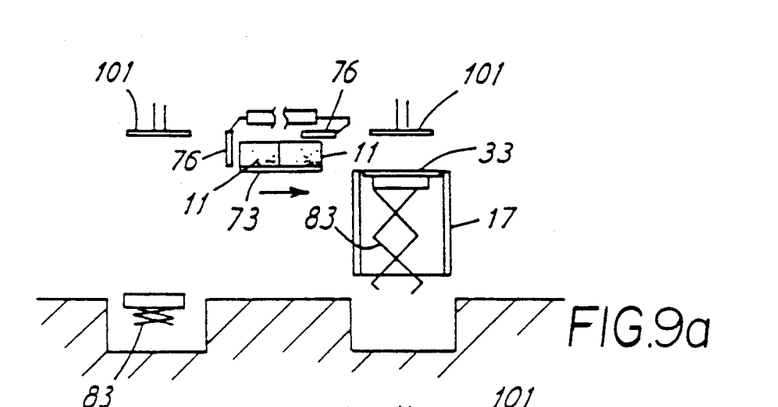
FIGS. 9a, 9b, 9c are diagrammatic views of components of the collator and a container in one of the container filling stations, illustrating the relative movements of the components during a cycle of operation of the collator.
Figure 9B:
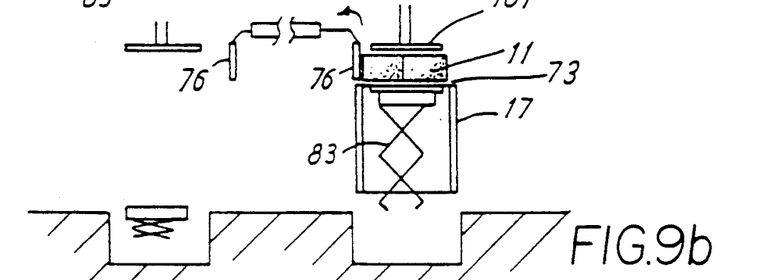
Figure 9C:
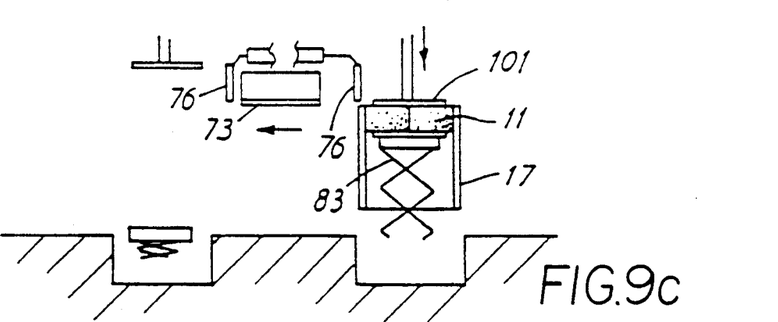

The carriage 73 of the collator, together with the four cheese blocks 11 thereon, is then moved into the container filling station 75 and directly above the container 17 therein, the associated gate 76 swung down into its closed position, and the carriage moved back into its central loading station. As explained previously, the carriage is free to pass below the closed gate 76 but the gate acts as a barrier to the cheese blocks and causes the cheese blocks to slide off the side edge of the moving carriage and drop down onto the end panel 33 in the top of the container. The platform 119 on the elevator is then lowered by a distance equal to the depth of the cheese blocks, and the follower plate 101 moved downwards by the ram 78 simultaneously with the downward movement of the elevator to ensure that the end panel 33 and the cheese blocks pass into the container. The cycle is then repeated to fill the container with cheese blocks in the manner already described in connection with the collator of FIG. 1, and the container sealed as previously described. The operational cycle of the collator is illustrated diagrammatically in FIGS. 9a, 9b, 9c.

The provision of two filling stations 75 in the collator enables a container at one station to be filled while a container which has previously been filled at the second station is withdrawn and replaced by an empty lined container. The rails 114 on the rear portion of the dolly enable trolleys to be moved across the gap in the rails 108 while a container on the dolly is being filled.

We claim:

1. A method of collating and consolidating blocks of natural cheese into a homogeneous mass of cheese comprising filling a container with freshly made unwrapped blocks of cheese at a temperature within the range of 24°-32° C., and permitting the blocks of cheese to spread into contact with each other under the overlying weight of the cheese, so that the blocks fuse together to form a homogeneous mass of cheese in the container.

2. A method as claimed in claim 1, wherein the container is filled with the cheese blocks while they are at a temperature of approximately 30° Celsius.

3. A method as claimed in claim 1, for collating and consolidating blocks of cheese formed by a process in which cheese curd passes through equipment which salts and mellows the curd prior to pressing of the curd into cheese blocks, wherein each cheese block is fed into the container within 60 minutes of discharge from the salting/mellowing equipment.

4. A method as claimed in claim 3, wherein each cheese block is fed into the container between 30-40 minutes from the time when the curd used to make the cheese block was discharged from the salting/mellowing equipment.

5. A method as claimed in claim 1, wherein the cheese blocks are formed by consolidating curd particles under vacuum at a temperature within the range 24°-32° Celsius and then compressing the consolidated curd, and the cheese blocks are produced at a rate sufficient to fill a container before the temperature of the blocks in the container drops below 24° Celsius.

6. A method of forming a homogeneous mass of natural cheese from cheese curd which has been salted and mellowed, comprising consolidating the curd particles under vacuum at a temperature within the range 24°-32° C. and compressing the consolidated curd to form blocks of cheese, and filling a container with the blocks of cheese without wrapping said blocks and while the cheese blocks are at a temperature within said range, each cheese block being fed into the container within 60 minutes of subjecting the curd particles forming the cheese block to said vacuum.

7. A method as claimed in claim 6, wherein each cheese block is fed into the container between 30-40 minutes of subjecting the curd particles forming the cheese block to said vacuum.

8. A method as claimed in claim 1, wherein the container is filled by depositing the cheese blocks in layers in the container, and pressing the cheese blocks in each layer against the cheese blocks in the underlying layer by a follower plate.

9. A method as claimed in claim 8, in which the cheese blocks for each layer are assembled prior to depositing the cheese blocks in the container, comprising holding the follower plate in contact with the cheese blocks in each layer to conserve heat therein while the cheese blocks for the next layer are being assembled.

10. A method as claimed in claim 8, comprising assembling the cheese blocks to form each layer on a platform, moving the platform into a position above the container, and withdrawing the platform below a fixed barrier preventing lateral displacement of the cheese blocks, whereby the cheese blocks drop into the container to form a layer of cheese blocks therein.

11. A method as claimed in claim 1, comprising positioning an open-ended container in an upright position with its walls substantially vertical, supporting an end panel for the container inside the container adjacent the upper end thereof, the end panel being of a size such that it can be lowered inside the container, depositing a layer of the cheese blocks having a temperature within said range on the end panel, lowering the end panel together with the cheese blocks supported thereon within the container in steps, each step corresponding approximately to the depth of said layer, and after each step depositing another layer of cheese blocks on the cheese blocks supported on the end panel until the container is filled with cheese blocks at a temperature within said range, and then closing the ends of the container.

12. A method as claimed in claim 11, wherein the container is lined internally with a tube of heat-sealable sheet material impervious to air and moisture, the tube extending out of the upper and lower ends of the container and the ends of the tube are sealed under vacuum after the container has been filled with cheese.

13. Apparatus for collating a plurality of blocks of cheese of substantially the same size in layers in a container, the apparatus comprising a frame straddling a container filling station, means for positioning an open-ended container in an upright position at the filling station with the walls of the container substantially vertical, an elevator for supporting an end panel within said container at said filling station, the elevator being operable to lower the end panel within the container in steps, each step corresponding approximately to the depth of a layer of cheese blocks, a floor plate movable on said frame between a loading station and said filling station, the floor plate at said filling station being directly above a container therein, means for loading cheese blocks onto the floor plate at the loading station, and means for withdrawing the floor plate at the filling station, whereby cheese blocks on the floor plate are deposited on the end panel or on a layer of cheese blocks on the end panel.

14. Apparatus as claimed in claim 13, wherein the floor plate comprises the floor of a carriage movable on the frame, the carriage having means for retracting the floor below a side wall of the carriage.

15. Apparatus as claimed in claim 13, comprising a trolley movable along rails on the frame, a cage suspended from the trolley by elevator means operable to raise and lower the cage, the cage having a floor constituting said floor plate, and means on the cage operable to retract the floor below a side wall of the cage when the cage is positioned at the container filling station.

16. Apparatus as claimed in claim 15, wherein the cage is fitted with a follower plate and means operable to press the cheese blocks into a container at the filling station upon retraction of the floor of the cage.

17. Apparatus as claimed in claim 13, wherein a barrier comprises a gate movable between an open position permitting passage of the platform and any cheese blocks thereon, and a closed position permitting passage of the platform but preventing passage of any cheese blocks thereon.

18. Apparatus as claimed in claim 13, wherein the frame straddles the loading station and two container filling stations arranged one on each side of the loading station, said floor plate being movable selectively between the loading station and either of the two filling stations.

19. Apparatus as claimed in claim 18, comprising two shuttle dollys movable along tracks into and out of register with the filling stations, each dolly having a track for supporting a wheeled trolley supporting a container to be filled, and each dolly being movable into a retracted position in which the track thereon is aligned with a track for removing the wheeled trolley with a filled container thereon.

20. Apparatus as claimed in claim 13, comprising a container locating device mounted on the frame at the filling station, the locating device comprising a collar engageable around the upper end of a container in the filling station, and means operable to pull the collar downwards into clamping engagement with the container.

* * * * *

UNITED STATES PATENT AND TRADEMARK OFFICE
CERTIFICATE OF CORRECTION

PATENT NO. : 5,175,014
DATED : December 29, 1992
INVENTOR(S) : Brockwell, et. al.

It is certified that error appears in the above-indentified patent and that said Letters Patent is hereby corrected as shown below:

| | |
|---|---|
| Col. 3, line 12, | change "is" (second occurrence) to --it--. |
| Col. 4, line 12, | change "ranges" to --range--. |
| Col. 6, line 12, | change "pate" to --plate--. |
| Col. 7, line 17, | change "i" to --in--. |
| Col. 7, line 48, | change "70" to --79--. |
| Col. 8, line 47, | (Claim 3) after "discharge", insert --of the curd--. |

Signed and Sealed this

Ninth Day of November, 1993

Attest:

BRUCE LEHMAN

Attesting Officer

Commissioner of Patents and Trademarks